Patented Jan. 7, 1941

2,227,748

UNITED STATES PATENT OFFICE 2,227,748

PROCESS FOR RIPENING CHEESE

Norman S. Golding, Pullman, Wash., assignor to State College of Washington Research Foundation, Pullman, Wash.

No Drawing. Application April 19, 1939,
Serial No. 268,748

4 Claims. (Cl. 99—115)

My present invention relates to a process for ripening cheese and is particularly adapted to the ripening of the cheeses generally classified as blue-vein cheese and known by name as Ambert, Bleu, Cheshire-Stilton, Dorset Blue, Gex, Gorgonzola, Iowa Blue, Danish Blue, Mont Cenes, Roquefort, Stilton and Wensleydale.

While I have named a number of cheeses of the blue-vein variety, it is to be understood that my process is not to be limited thereby, and that it may be adapted to any other variety, no matter by what name it may be called.

The primary objects of the invention are to provide a control over the ripening conditions to which the cheeses may be subjected so that desirable mold growths will result; to provide a control over the ripening steps of cheese whereby the growth of undesirable molds is greatly inhibited; to provide a process for ripening cheese of the type mentioned that is of a uniform quality; to provide a process for ripening cheese wherein the cheese may be ripened in a container and subsequently sealed and marketed therein; to provide a ripening process for blue-vein cheese wherein de-hydration is reduced to a great degree; and to permit the production of a blue-vein cheese under conditions dissimilar to those in which the well-known Roquefort, Gorgonzola and Stilton types are ripened, but with similar resulting cheese closely approximating the standards in quality, texture and flavor.

The process of my invention consists in certain novel combinations and arrangements of steps in the ripening of cheese, as will be more fully set forth and claimed. In the accompanying specification I have described the steps employed in the ripening of cheese of one type in a metal container, but it will be understood that the invention may be carried out by the utilization of any suitable container as well as ripening appliances and apparatus for the production of cheese in quantity for use and distribution commercially.

While in the specification I have set forth one complete mode for carrying out the invention, it will be understood that changes and variations may be made in the exemplifying steps of the process within the scope of the claims attached hereto without departing from the principles of my invention.

It has been my observation from experiments and from practical cheese-making activities with which I have been associated that if a simple and practical process of ripening cheese could be evolved for the production of blue-vein cheese, such as Roquefort-type, having all the desirable characteristics of genuine Roquefort but lacking the unsatisfactory procedures which accompany all of the former attempts to produce such a cheese, a highly useful object would be accomplished and a basis for increased cheese production would be provided. The steps of my process have been developed to effect such a result.

The current popularity of cheeses packaged in individual containers has been very marked in commercial centers, but it is to be noted that a "true" blue-veined cheese in its unaltered and unpasteurized form is not available on the market. My process lends itself well to the packaging and ripening of a "true" Roquefort-type in a container which needs only to be sealed and labelled to be ready for commercial marketing. Such a process as mine eliminates the difficulties of "bulging" and spoilage that have attended so many of the early attempts.

The process is performed by taking a quantity of fresh curd produced by a blue-vein cheese-making process for the production of Roquefort-type cheese, and properly inoculating it with the desired strain of blue mold. This is generally accomplished by treating the curd by the interspersion therein of crumbs of previously molded bread. Any method of inoculation of the blue mold will perform equally well with my process.

The inoculated curd is salted in the usual manner, the quantity of salt used depending entirely upon the flavor most desirable to be produced. The manner of salting the curd is accomplished in accordance with the usual practices of commercial cheese making.

When the cheese has been properly salted and inoculated with the chosen penicillium it is ready for packaging. If it is desirable, the treated curd may be formed in suitable hoops of the type commonly used in cheese manufacture, and of a shape and size to produce a cheese which will fill the container to a level even with the top edge. It is contemplated that the inoculation may be effected in this step in the manner practiced in the French manufacture of Roquefort; that is, the curd may be laid in the hoops in two or more layers with molded crumbs interspersed between the layers. Upon being removed from the hoops, the molded curd will immediately be placed in the chosen container, as in this example, in a metal container.

On the other hand, the curd may be introduced directly to the container and securely packed therein through the application of external pressure or through any vibratory settling manner or by a combination of both means, the container being filled.

The packaged curd at this stage of the process is ready for further ripening, which is accomplished while the cheese is kept in a suitable ripening room. The ripening room that must be used in practicing my process must be of such a nature that the ingress and egress of air and other gases is at all times under positive control of the operator. It is further necessary that the ripening room be provided with means for controlling the temperature and the humidity. Heating and cooling devices and suitable humidifying apparatus are readily available in the open market, and any device affording a reasonably critical control is sufficient for my purposes.

During the ripening of cheese of the Roquefort type certain desirable molds grow upon and within the cheese, and it is my observation that this growth takes place shortly after the cheese has been placed in the ripening room, early in the ripening process. This fact is mentioned at this time, as later in this description the application of the process will be made to another type of cheese in which the growth of the desirable mold occurs at a later stage in the ripening process.

My work with the growing of the desirable molds, as well as my observation, has taught me that the growth of these molds can be enhanced as well as controlled to permit growth at the desired rate, through the use in the ripening room of various quantities of oxygen, nitrogen and carbon-dioxide. The concentration of these gases in the ripening room will vary from time to time throughout the ripening process in accordance with the progress of ripening as well as under conditions in which the curd or growth of the penicillium varies. While I have explained that the gases oxygen, nitrogen and carbon-dioxide are useful to promote the growth of desirable molds, it is to be understood that the same gases function equally as well under certain concentrations to retard the growth of the undesirable molds.

The practical application of my process may be more fully understood from the following explanation. Strains of penicillium roqueforti will grow equally as well as undesirable molds at the optimum temperature of growth, which is normally above 55 degrees F. The presence of salt in the media (in this case the curd) inhibits all mold growth above a certain salt concentration to some extent, and this inhibition varies greatly upon changes of the moisture content of the cheese as well as changes in the humidity in the surrounding air.

By substituting carbon-dioxide for air to raise the concentration up to approximately 10%, an acceleration of mold growth takes place. This acceleration depends upon the temperature as well as the variety of the mold strain. A further increase in the concentration of carbon-dioxide will steadily reduce mold growth until a state of stasis is reached. This static condition is reached sooner at lower temperatures of from 45 to 55 degrees F. than at high temperatures.

The blue molds, such as P. roqueforti, however, are less inhibited than practically any other type of mold in a high concentration of carbon-dioxide at the lower temperatures. My process therefore operates only to inhibit the growth of the blue molds slightly, while the other molds which are undesirable are practically in a condition of stasis.

It will be understood that a principal step in my process of properly ripening blue-veined cheese is the use of a concentration of gases, such as oxygen, nitrogen and carbon-dioxide, during the ripening stages of the cheese to produce the desired mold growth of strains of P. roqueforti over undesirable molds. At the same time, these same gases, together with controlled temperature and controlled humidity and various concentrations of salt, combine to form an ideal inhibitant of undesirable mold growths during the ripening stages of the cheese.

The development of the cheese during this stage is in no way affected by the fact that it is packed in a container, in view of the fact that the container is left uncovered so that the gases will have ready access to the cheese itself. If it is deemed necessary or desirable to provide further access of the gases to the interior of the cheese, the cheese may be pierced by needles to form small passages into the interior.

In other varieties of cheeses of the blue-veined type, such as Stilton for example, certain anerobic ripening must occur before the aerobic ripening can be permitted to take place. Under my process, after the cheese is placed in the ripening room in its container, I maintain a high concentration of carbon-dioxide and control the temperature to maintain it at a relatively low point, during which time all mold growth, both desirable and undesirable, is inhibited completely. When the anerobic ripening has progressed to the desired degree, the temperature is raised slightly and aerobic ripening will then begin. Aerobic ripening as before described will then be permitted under the controlled conditions of my process until the desired degree of ripening is reached.

The cheese in its containers, when fully ripened (except for such enzyme activity as may subsequently take place) may now be vacuum sealed in the original containers and be marketed without further handling. While there is great authority to the effect that ripening never ceases, further ripening of cheese produced according to the above described process is partly inhibited by the presence of carbon-dioxide in the cheese itself which was absorbed during the gas-controlled ripening stage. Such gases as may be produced during such post-ripening will be of such a minute quantity that no bulge of the container or its cover can occur, due to the fact that the vacuum sealing has removed all volatilized gases from the interstices of the cheese and from such space in the container as is not filled with cheese, leaving more than enough room for the accommodation of these gases.

Having thus fully described my invention, what I claim as new and desire to secure by Letters Patent is:

1. A process of ripening cheese of the blue-vein types which consists in maintaining mold-inoculated cheese in a concentration of carbon-dioxide gas above that normally produced by the ripening of the cheese at a sub-optimum temperature during part of the ripening stage of the cheese.

2. A process of ripening cheese of the blue-vein types which consists in maintaining mold-inoculated cheese in a high concentration of carbon-dioxide gas above that normally produced by the ripening of the cheese at an extreme sub-optimum temperature during a period of anerobic ripening, then raising the temperature to permit aerobic ripening.

3. A process of ripening and packaging cheese of the blue-vein types which consists in mold-inoculating curd, packing the curd in a suitable container, maintaining the container and its contents in a suitable ripening room in the presence of a concentration of carbon-dioxide gas above that normally produced by the ripening of the cheese and at an extreme sub-optimum temperature during a period of anerobic ripening, and raising the temperature to permit aerobic ripening while maintaining the concentration of carbon-dioxide gas.

4. A process of ripening cheese of the blue-vein types which consists in maintaining mold-inoculated cheese in a high concentration of carbon-dioxide gas above that normally produced by the ripening of the cheese at an extreme sub-optimum temperature during a period of anerobic ripening, then raising the temperature and lowering the concentration of carbon-dioxide to permit aerobic ripening.

NORMAN S. GOLDING.